(No Model.)
T. H. SPRINGER.
CENTRIFUGAL MACHINE.
No. 547,404.                    Patented Oct. 1, 1895.
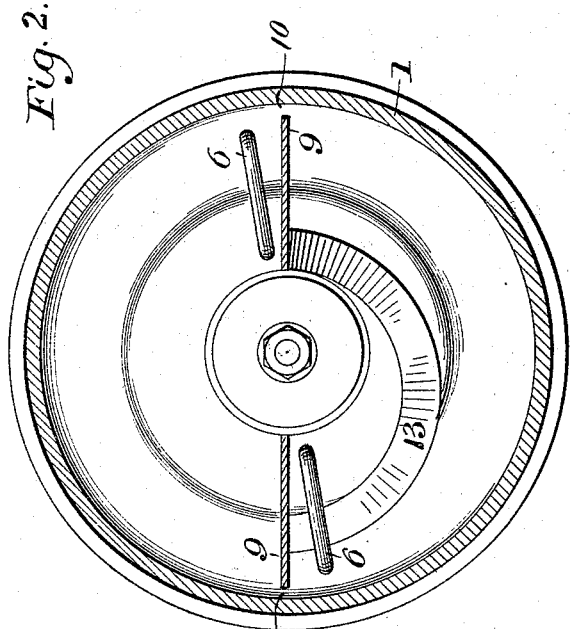
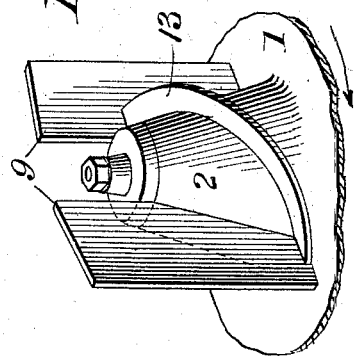
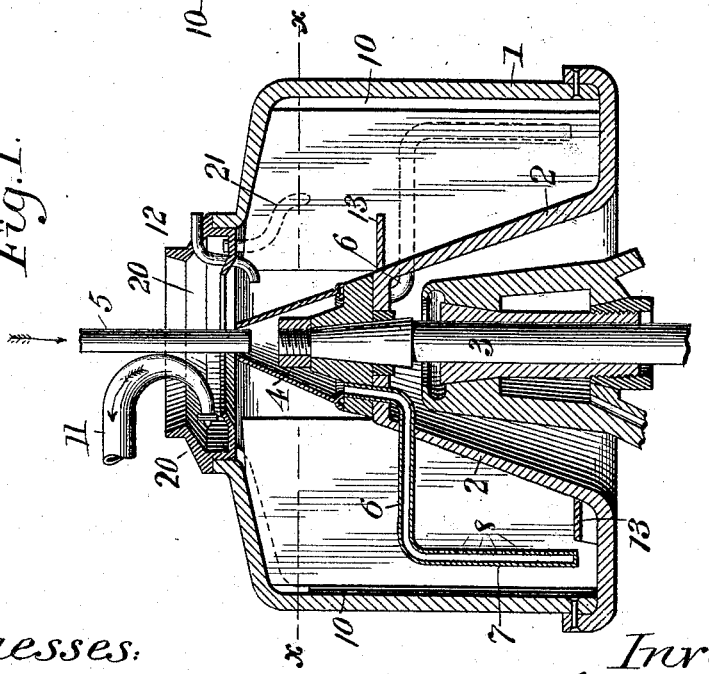
Witnesses:
R. Caldwell.
P. C. Worthington
Inventor
Thomas H. Springer
by Geo. H. Holgate atty

UNITED STATES PATENT OFFICE.

THOMAS H. SPRINGER, OF PHILADELPHIA, PENNSYLVANIA, ASSIGNOR TO THE SPRINGER SEPARATOR COMPANY, LIMITED, OF SAME PLACE.

CENTRIFUGAL MACHINE.

SPECIFICATION forming part of Letters Patent No. 547,404, dated October 1, 1895.

Application filed March 16, 1895. Serial No. 542,025. (No model.)

*To all whom it may concern:*

Be it known that I, THOMAS H. SPRINGER, a citizen of the United States, residing at Philadelphia, in the county of Philadelphia and State of Pennsylvania, have invented certain new and useful Improvements in Centrifugal Machines, of which the following is a specification.

My invention relates to certain new and useful improvements in centrifugal machines for separating liquids, but more especially to that class used for separating cream from milk, and has for its object to increase the capacity of such machines without complicating their construction; and with this end in view my present device consists in certain details of construction and combination of elements hereinafter set forth, and then specifically designated by the claims.

In order that those skilled in the art to which my invention appertains may fully understand how to make and use the same, I will proceed to describe its construction and operation in detail, referring by numbers to the accompanying drawings, which form a part of this specification, and in which—

Figure 1 is a central vertical section of the bowl of a separator, showing the arrangement and relative positions of the several parts. Fig. 2 is a horizontal section taken at the line *x x* of Fig. 1, the conical supply-cap being removed; and Fig. 3 is a detail perspective of the revolving cone, wings, and spiral.

Similar numbers denote like parts in the several views of the drawings.

1 is a bowl, of the usual construction in such machines, having a conical center 2, projecting therein, which latter bears upon and revolves with the central spindle 3; but as this feature of the machine is shown and described by me in previous applications for Letters Patent and forms no part of my present invention I will not enter into a detailed description thereof.

4 is the receiving-chamber, which is fed by the pipe 5, entering its center at the top, and from the bottom of this chamber lead pipes 6, which extend within the bowl at right angles to the axis thereof and then downward, terminating in the branches 7. These branches are closed at their lower ends and provided throughout their lengths upon their inner surfaces with small holes or perforations 8, so that it will be seen that the supply of milk passing through the receiving-chamber will flow into the bowl in a number of small sprays or streams projected radially toward the center of the bowl, where the cream will stay; but the milk will be driven to the circumference by centrifugal force on account of the difference of gravity between the cream and milk.

9 are wings secured to the cone 2 and to the top and bottom of the bowl, thus dividing the said bowl into two compartments, but leaving long narrow passages 10 between the outer edge of the wings and the side of the bowl, through which the milk in the two compartments may flow. The inner edges of these wings terminate inside of the vertical creamline, so that the cream will always revolve with said wings.

11 is the usual outlet for the separated milk and terminates in the annular recess 20, and 21 is a pipe adapted to convey the separated milk from the bowl to said recess.

12 is the outlet for the cream, and 13 is a band secured to the cone 2 on an incline extending from the bottom of said cone to the top thereof between the wings 9, so as to form a spiral blade for the purpose of facilitating the upward movement of the contents of the bowl when the latter is rotated.

From the foregoing description the operation of my improvement will be obviously as follows: The milk to be operated upon being fed through pipe 5 to the receiving-chamber, and from thence by the perforations 8 to the bowl, and said bowl being caused to revolve in the direction of the arrows in Figs. 2 and 3 the centrifugal action of the bowl upon the milk will give the latter a tendency to bear upon the sides of the bowl and the inertia of the milk will be partly overcome by the wings 9 so as to prevent churning; but the space between the said wings and the bowl will permit a certain flow of said milk from one compartment to the other, and as the inner ends of the pipes 11 and 12 are set at a tangential angle to the line of movement of the bowl the inertia of the milk and cream will cause them to rise in said pipes and flow through the same to the proper receptacles, and as the end of pipe 21 is on a lower plane than that of the pipe 12 it follows that the cream, which is the lighter and therefore thrown to the top, will be carried off by pipe 12, while the skim-milk will be carried off by pipe 11, as is usual in this class of machines. This cream-pipe is preferably round.

I have found by experience that when the supply of milk is admitted to the bowl at the bottom thereof and centrifugal force alone is depended upon to separate and throw the cream to the top the operation is somewhat retarded; but I overcome this disadvantage and greatly expedite the separation of the cream from the milk by conducting the supply to the bowl in small streams at different horizontal planes and by providing a spiral blade 13, which acts against the milk thus admitted, and which, on account of the inertia of said milk, causes it to take a general upward movement, and this, in conjunction with the centrifugal action of the machine, quickly separates the cream from the milk and permits it to be carried off, as before described.

Having thus fully described my invention, what I claim as new and useful is—

1. In a separator, a bowl having a conical center, a spiral blade arranged on the cone, between the wings, feed pipes having perforations on the sides facing the center of the bowl and means for carrying off the contents of the bowl as and for the purpose described.

2. In a separator, a bowl having a conical center, spiral blades secured on the cone, wings on the cone extending toward but not touching the walls of the bowl, supply pipes having perforations on the inner side and means for carrying off the contents of the bowl for the purpose described.

In testimony whereof I have hereunto affixed my signature in the presence of two subscribing witnesses.

THOMAS H. SPRINGER.

Witnesses:
SAMUEL L. TAYLOR,
S. S. WILLIAMSON.